United States Patent
Nakatani

[11] Patent Number: 6,095,592
[45] Date of Patent: Aug. 1, 2000

[54] CONSTRUCTION OF ROOT PORTION OF FRONT SIDE MEMBER

[75] Inventor: Shinsuke Nakatani, Kanagawa-ken, Japan

[73] Assignee: Nissan Motor Co., Ltd., Yokohama, Japan

[21] Appl. No.: 09/163,413

[22] Filed: Sep. 30, 1998

[30] Foreign Application Priority Data

Oct. 9, 1997 [JP] Japan .................................. P9-277564

[51] Int. Cl.[7] .................................................. B62D 25/08
[52] U.S. Cl. .......................... 296/188; 296/194; 296/72; 296/203.02
[58] Field of Search ..................... 296/194, 188, 296/185, 70, 72; 180/90

[56] References Cited

U.S. PATENT DOCUMENTS

| | | | |
|---|---|---|---|
| 4,669,776 | 6/1987 | Harasaki | 296/194 |
| 4,789,198 | 12/1988 | Ide | 296/192 |
| 5,713,625 | 2/1998 | Takahashi et al. | 296/194 |
| 5,857,726 | 1/1999 | Yokoyama et al. | 296/70 |
| 5,882,065 | 3/1999 | Koiwa et al. | 296/203.02 |

FOREIGN PATENT DOCUMENTS

| | | |
|---|---|---|
| 7-165118 | 6/1995 | Japan . |
| 9-95260 | 4/1997 | Japan . |

*Primary Examiner*—D. Glenn Dayoan
*Assistant Examiner*—Patricia Engle
*Attorney, Agent, or Firm*—McDermott, Will & Emery

[57] ABSTRACT

In a root portion of a front side member, the front side member is extended to a forward-and-backward direction of a vehicle body. At the root portion of the front side member, the front side member is joined to a lower surface of a floor panel. The floor panel to which the front side member is joined is jointed to a first dash panel. A first bent portion is provided to the front side member so that the front side member is bent to the downward direction of the vehicle body, a slanted portion is provided to the front side member so that the front side member is slanted from the first bent portion towards the lower surface of the floor panel, and a second bent portion is provided to the front side member so that the front side member is bent from the slanted portion towards the lower surface of the floor panel. Further, a gap is left between the first bent portion and the first dash panel, and a second dash panel is provided by utilizing this gap.

14 Claims, 4 Drawing Sheets

CONSTRUCTION OF ROOT PORTION OF FRONT SIDE MEMBER

The contents of Application No. TOKUGANHEI 9-277564, with a filing date of Oct. 9, 1997 in Japan, are hereby incorporated by reference.

BACKGROUND OF THE INVENTION

1. Field of the Invention

The present invention relates to a construction of a root portion of a front side member, more specifically relates to a construction of a root portion of a front side member extended in a forward-and-backward direction (longitudinal direction) of a vehicle body.

2. Description of the Related Art

Conventionally, such a construction of a root portion of a front side member in a vehicle has been disclosed in Japanese Patent Application Laid-Open No. 7-165118 (1995), or is shown in FIG. 1.

In FIG. 1, a front side member 1, which extended in a forward-and-backward direction of a vehicle body, is joined to a dash panel 2 at a root portion R of the front side member 1 by spot-welding at front surface of the dash panel 2 and is extended beneath a floor panel 4, so the front side member 1 is bent downward at a first bent portion 1a on a forward side of the dash panel 2, and it is bent so as to be parallel with the floor panel 4 at a second bent portion 1b whose height is approximately same as that of the floor panel 4, and it is joined to a lower surface of the floor panel 4.

In the conventional construction, for example, when an input is applied to the front side member 1 along the direction from the front side to the rear side of the vehicle body at the time of a head-on collision, the front side member 1 has a tendency to be broken easily at a bent portion off-set in an up-and-down direction viewed from the front, namely, at the second bent portion 1b. When the front side member 1 is broken at the second bent portion 1b, the first bent portion 1a of the front side member 1 is turned around the second bent portion 1b toward the dash panel 2, a joint portion 1c which is joined to the dash panel 2 and is a part of the front side member 1 is also turned, and thus the dash panel 2 might be deformed. In order to avoid this deformation, the second bent portion 1b is stiffened so as not to be broken, or the dash-panel 2 is stiffened so as not to be deformed.

However, to stiffen the front side member 1 or the dash panel 2 possibly causes an increase in weight, and moreover a crushable zone which is effectively crushed at the time of a collision is possibly decreased, so there arises a problem such that absorption amount of impact energy cannot be increased.

SUMMARY OF THE INVENTION

It therefore is an object of the present invention to provide a construction of a root portion of a front side member in which absorption amount of impact energy given at the time of a head-on collision, etc. is increased and a stress generated by input applied at the time of a head-on collision, etc. is dispersively distributed, so that unnecessary deformation of a dash panel, etc. of a vehicle body is lowered efficiently.

Namely, in the construction of the root portion of the front side member of the present invention, the front side member is substantially extended in a forward-and-backward direction (longitudinal direction) of the vehicle body. Moreover, in the root portion of the front side member, the front side member is substantially joined to a lower surface of a floor panel having a panel surface formed in a right-and-left direction (lateral direction) and the forward-and-backward direction of the vehicle body. Here, the floor panel to which the front side member is joined is jointed to a first dash panel having a panel surface substantially formed in the right-and-left direction and a up-and-down direction (vertical direction) of the vehicle body.

The construction of the root portion of the front side member having the above arrangement according to the present invention is provided with a first bent portion which is provided to the front side member so that the front side member is bent in a downward direction of the vehicle body, a slanted portion which is provided to the front side member so that the front side member is slanted from the first bent portion towards the lower surface of the floor panel, and a second bent portion which is provided to the front side member so that the front side member is bent from the slanted portion towards the lower surface of the floor panel.

Further, in the construction of the root portion of the front side member having the above arrangement according to the present invention, a gap is left between the first bent portion and the first dash panel, and a second dash panel is provided by utilizing the gap.

Here, in the case where an input directing from the front side to the rear side of the vehicle body is applied to the front side member at the time of a head-on collision, for example, the force is transmitted from the front side member via the second dash panel to the first dash panel.

Namely, according to this arrangement, in the case where the front side member is broken at the second bent portion at the time of a head-on collision, for example, and the first bent portion of the front side member is turned around the second bent portion towards the first dash panel, a stress generated in the front side member is not transmitted directly to the first dash panel but first to the second dash panel.

Accordingly, the second dash panel to which the stress was transmitted is crushed efficiently, and absorbs received impact energy efficiently.

Furthermore, since an area where the first dash panel contacts with the second dash panel can be acquired sufficiently, even if the stress transmitted to the second dash panel is transmitted to the first dash panel, the stress is efficiently distributed in dispersive and transmitted to the second dash panel.

Therefore, the impact energy applied to the first dash panel is reduced efficiently, and the stress generated in the first dash panel is weak, so a deformation of the first dash panel is reduced efficiently.

Furthermore, a portion where the root portion of the front side member is jointed to the second dash panel is in a more forward position of the vehicle body than a conventional portion where it is jointed to the first dash panel. Namely, the portion where the root portion of the front side member is jointed to the second dash panel is in a position closer to an engine, suspension, etc. which apply a load to the vehicle body, so rigidity of a supporting portion on the side of the vehicle body such as the engine or the suspension is also improved efficiently.

More specifically, it is a suitable arrangement that the second dash panel has an offset surface which is substantially extended from the first bent portion of the front side member to the upward direction of the vehicle body, and a coupling surface which is substantially extended straight from an upper end portion of the offset surface towards the first dash panel and is joined to the first dash panel.

According to this arrangement, as for the input directing from the front side to the rear side of the vehicle body applied to the front side member, its transmitting direction is deviated efficiently on the offset surface of the second dash panel.

Namely, the stress transmitted to the second dash panel is dispersed efficiently, so even if the stress is transmitted to the first dash panel, the stress dispersed efficiently is transmitted to the first dash panel.

Therefore, since the stress generated in the first dash panel is weak, a deformation of the first dash panel is reduced efficiently.

In addition, more specifically, it is a suitable arrangement that the front side member is provided to each of the right and left sides of the vehicle body, and the second dash panel connects the front side members provided to the right and left sides of the vehicle body. According to this arrangement, even in the case of an offset collision, for example, the input applied to one front side member is transmitted to the other front side member so as to be dispersed, so a deformation of the first dash panel is reduced efficiently.

Further, since the front side members provided to the right and left sides of the vehicle body are connected with each other by the second dash panel, rigidity of the vehicle body around an engine room is also improved.

Here, it is preferable that the second dash panel connects the front side members provided to the right and left sides of the vehicle body at the first bent portions thereof because the input applied to one front side member is transmitted to the other front side member securely and efficiently so as to be dispersed.

In addition, more specifically, it is preferable that the second dash panel as well as the first dash panel forms a closed cross section because the strength between the front side members and the first dash panel is further improved.

Here, it is preferable that the closed cross section is substantially extended to the right-and-left direction of the vehicle body because the strength between the front side members and the first dash panel is further improved.

In addition, it is preferable that the front side member is provided to each of the right and left sides of the vehicle body, and the closed cross section is extended between the first bent portions positioned respectively to the front side members provided to the right and left sides of the vehicle body because the strength between the front side members and the first dash panel is further improved, and even in the case of an offset collision, for example, the input applied to one front side member is transmitted also to the other front side member so as to be dispersed.

DETAILED DESCRIPTION OF THE PREFERRED EMBODIMENT

Figure 1:
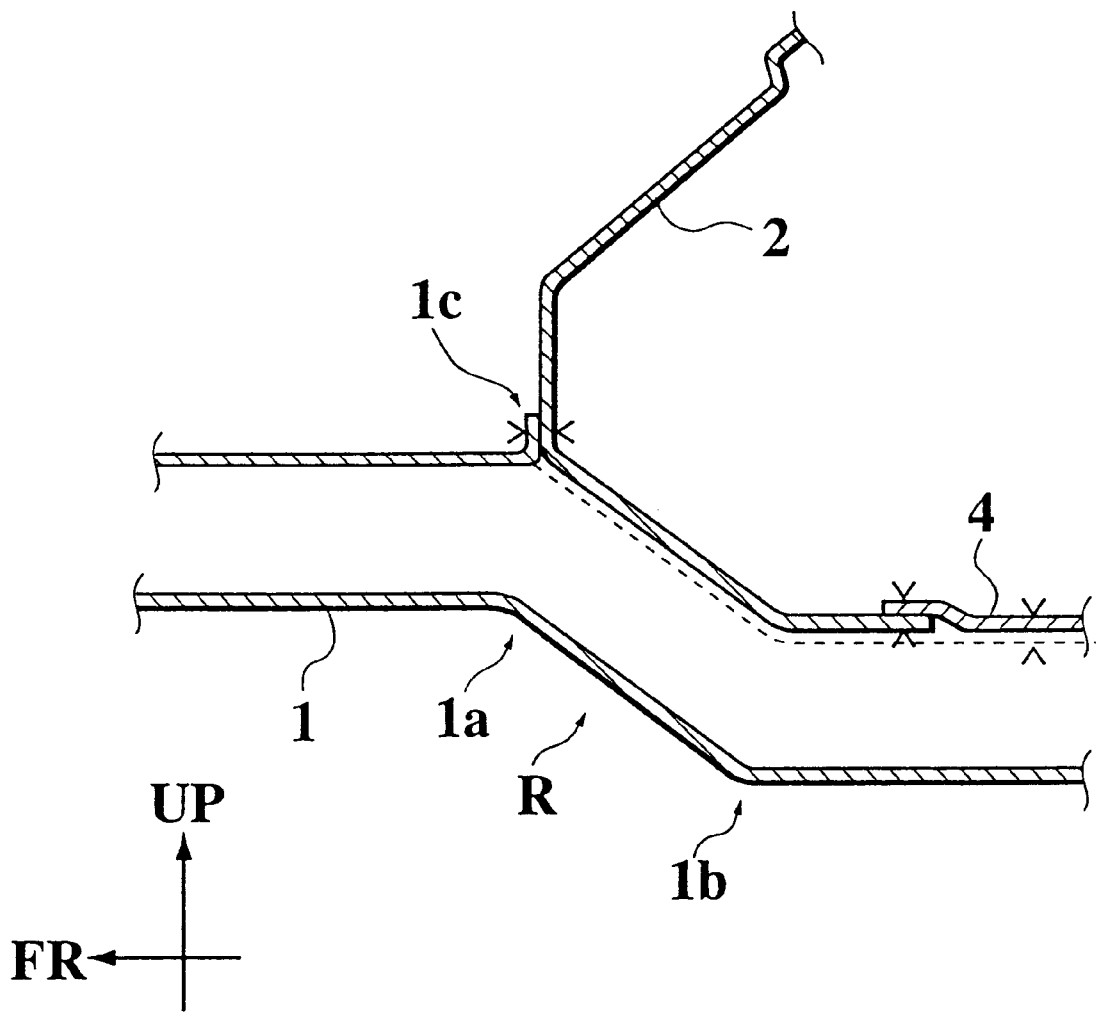
FIG. 1 is a sectional view showing a conventional construction of a root portion of a front side member.
Figure 2:
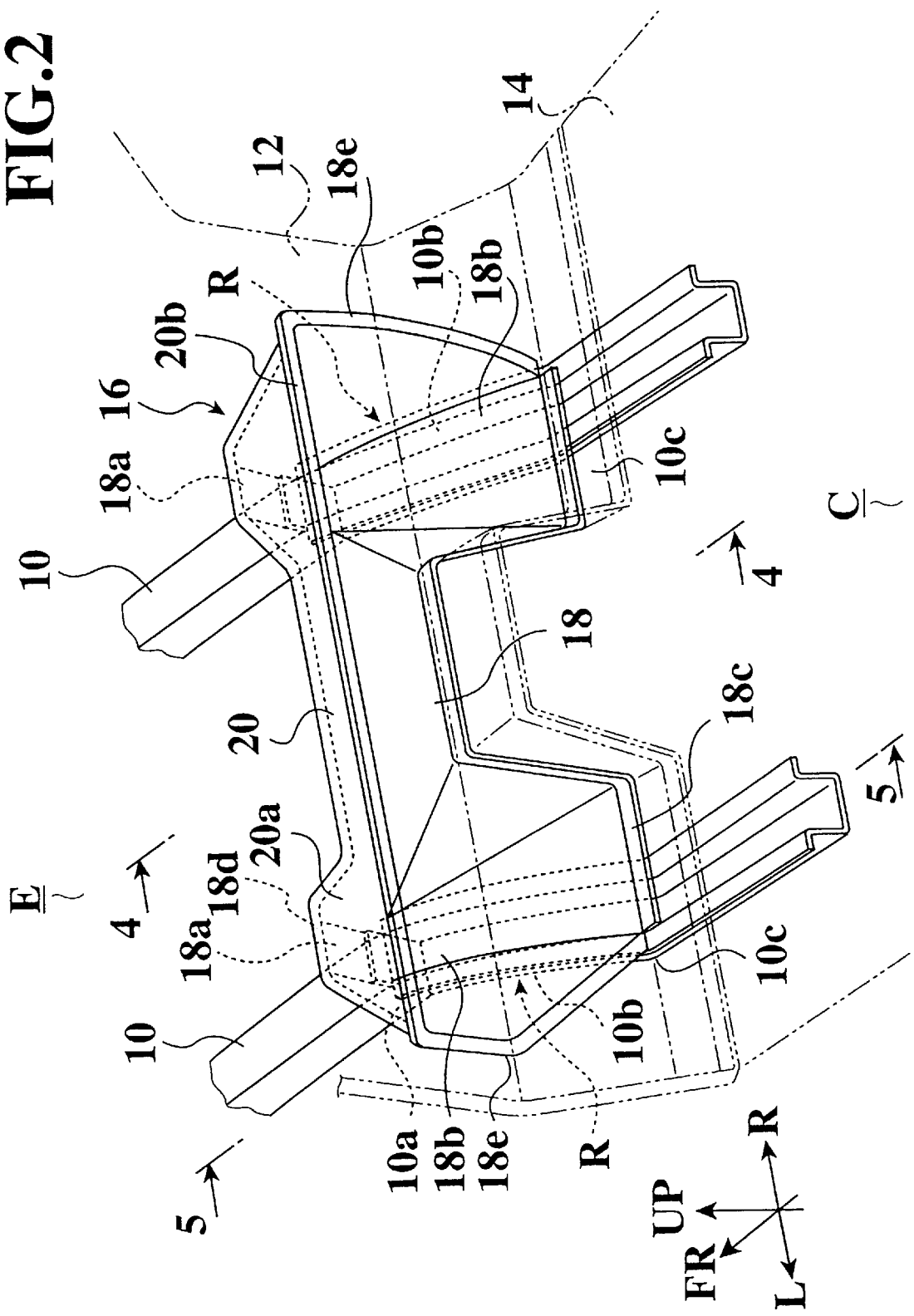
FIG. 2 is a perspective view viewed from a backward side of a vehicle body in a construction of a root portion of a front side member according to an embodiment of the present invention.
Figure 3:
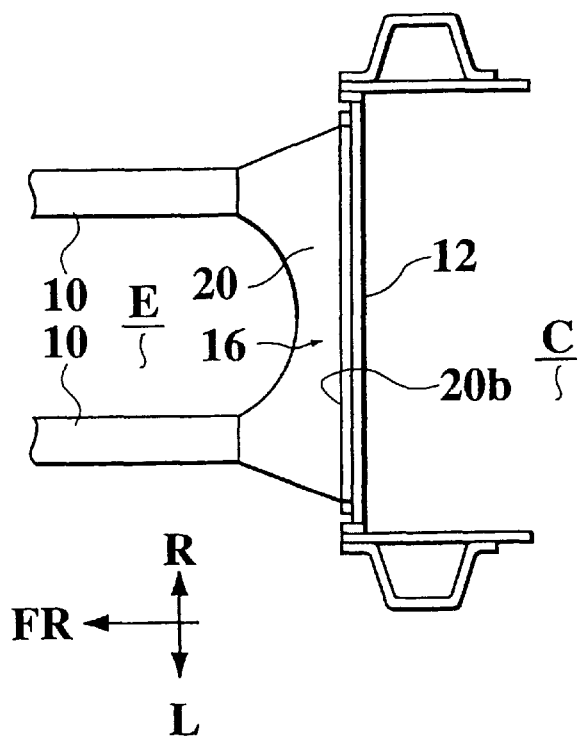
FIG. 3 is a plan view viewed from an upper-side of the vehicle body in the construction of the root portion of the front side member according to the embodiment.
Figure 4:
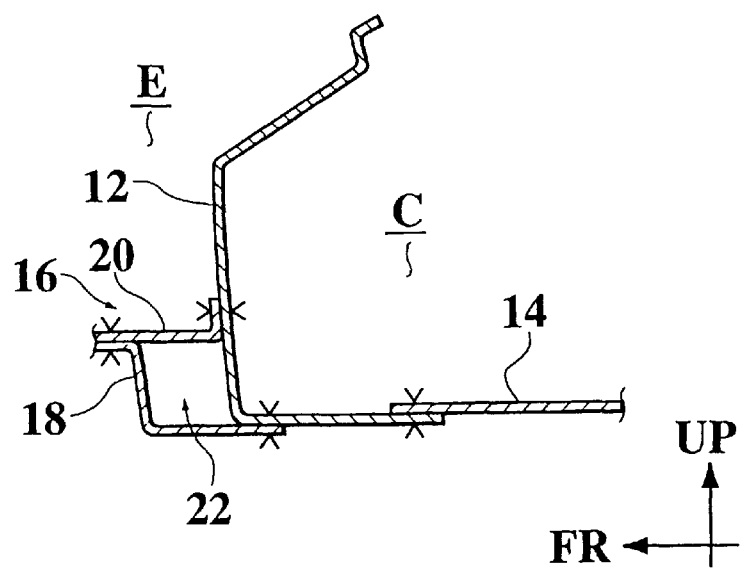
FIG. 4 is a sectional view taken along line 4—4 in FIG. 2.

The following will describe in detail embodiment of the present invention on reference to FIGS. 2 through 6. Here, in the drawing, FR is a forward side of a vehicle body, UP is an upper side of the vehicle body, L is a left side of the vehicle body and R is a right side of the vehicle body. In FIG. 2, a dash panel and a floor panel are represented by a hypothetical line.

Front side members 10 which are extended in a forward-and-backward direction of the vehicle body are respectively provided to right and left portions of the vehicle body. The respective front side members 10 are extended approximately horizontally and in the forward-and-backward direction (longitudinal direction) at more forward portions than a dash lower panel (first dash panel) 12 which divides an engine room E and a vehicle compartment C. The front side members 10 detour the vehicle compartment C so as to be lowered at the root portions R of the front side members 10, namely, in the vicinities of the dash lower panel 12, and the front side members 10 are joined by spot welding to a lower surface of a floor panel 14 which is jointed to a lower backward end of the dash lower panel 12 by spot welding.

More specifically, at the root portions R of the front side members 10, the front side members 10 respectively have bent portions 10a (first bent portions) which are bent downward, slanted portions 10b which are slanted from the bent portions 10a towards the lower surface of the floor panel 14, and second bent portions 10c which are bent horizontally so as to be parallel with the floor panel 14. Gaps are left in positions, which are more backward than the bent portions 10a and more forward than the dash lower panel 12, between the bent portions 10a and the dash lower panel 12, and a second dash lower panel (second dash panel) 16, which is not the dash lower panel 12 and is another one, is placed therebetween.

The second dash lower panel 16 is constructed by an offset panel 18 having an offset surface 18a extended upward from the bent portions 10a, and a coupling panel 20 having a coupling surface 20a which is joined to an upper end flange 18d of the offset panel 18 by spot welding and is extended straight towards the dash lower panel 12. A backward end flange 20b of the coupling panel 20 is joined to the dash lower panel 12 by spot welding. Moreover, the offset panel 18 has also slanted surfaces 18b which are extended downward gradually as they go backward, and upper portion turn-up flanges of the slanted portions 10b of the front side members 10 are jointed to the slanted surfaces 18b by spot welding. Further, lower ends 18c of the slanted surfaces 18b are joined to the lower surface of the dash lower panel 12 by spot welding.

In the second dash lower panel 16 of the above arrangement, the offset panel 18 connects the bent portions 10a of the right and left front side members 10 so that they are integral with each other, and their both side ends 18e are joined to the dash lower panel 12 by spot welding in a position which is more outer than the front side members 10 in a vehicle-widthwise direction (lateral direction). In the same manner, the coupling panel 20 is spread in the vehicle-widthwise direction so as to exceed the right and left front side members 10 and thus it is also composed integrally. The offset panel 18 and the coupling panel 20 as well as the dash lower panel 12 compose a closed cross section 22 extended in the vehicle-widthwise direction across the bent portions 10a of the right and left front side members 10. Particularly, in the vicinity of the center of the vehicle-widthwise direction between the bent portions 10a of the right and left front side members 10, the offset panel 18 is close to the dash lower panel 12 so as to compose the rectangular closed cross section 22 (see FIG. 4).

Figure 5:
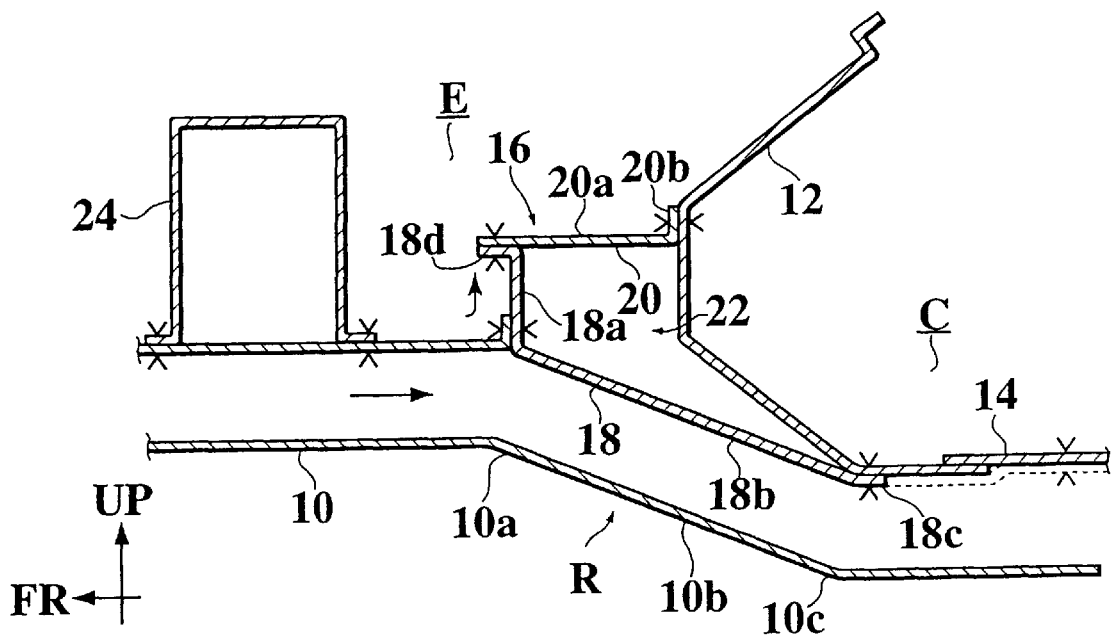
FIG. 5 is a sectional view taken along line 5—5 in FIG. 2.
Figure 6:
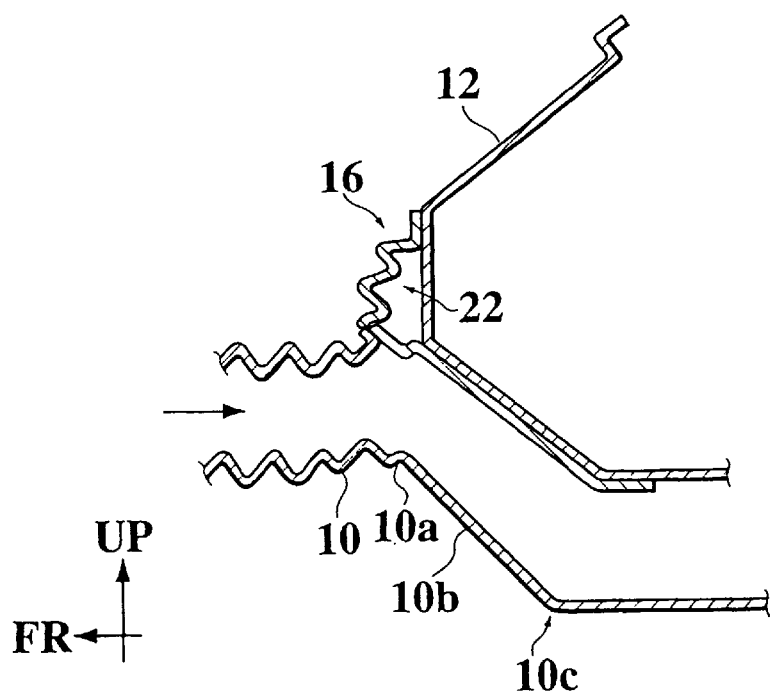
FIG. 6 is a drawing corresponding to FIG. 5 which complies with a head-on collision.

In the construction of the root portion of the front side member having the above arrangement according to the present embodiment, as shown by a straight arrow in FIG. 5, when an input is applied, from the front side to the rear side, to the front side members 10 at the time of a collision, similarly to the conventional case, the front side members 10 are broken at the bent portions, namely, the second bent portion 10c, and the bent portion 10a is rotated around the second bent portion 10c towards the dash lower panel 12. However, stress, which is generated from the front side members 10 and applied from the front side, is not transmitted directly to the dash lower panel 12, and as shown by an arrow directing upward in FIG. 5, the stress is transmitted first to the second dash lower panel 16, so as shown in FIG. 6, the second lower panel 16 is crushed, and thus impact energy can be absorbed efficiently. Further, an area where the second dash lower panel 16 contacts with the dash lower panel 12 is remarkably larger than an area where the conventional front side member contacts with the dash panel, so the stress, which is generated by a force transmitted from the second dash lower panel 16 to the dash lower panel 12, is reduced efficiently. Therefore, a deformation of the dash lower panel 12 can be suppressed as much as possible. Here, a thickness of the second dash lower panel 16 is selected so that the second dash lower panel 16 can be crushed without deforming the dash lower panel 12 at the time of a collision.

Furthermore, since the offset surfaces 18a of the offset panel 18 are extended upward from the bent portions 10a, as for the input from the front side members 10 directing to a direction which is vertical to the surface of the dash lower panel 12, its direction is deviated by the offset surface 18a, and the input is dispersed through the offset panel 18 so as to be distributed there by its side ends 18e, lower backward ends 18c, the backward end flange 20b of the coupling panel 20, etc., and then transmitted to the dash lower panel 12. Therefore, the stress to be transmitted to the dash lower panel 12 can be further weakened.

Further, the closed cross section 22 composed of the second dash lower panel 16 and the dash lower panel 12 is extended in the vehicle-widthwise direction between the bent portions 10a of the right and left front side members 10 so as to function as a so-called cross member. Therefore, the strength of the dash lower panel 12 also between the front side members 10 can be improved.

Namely, in the construction of the root portion of the front side member according to the present embodiment, the second dash lower panel 16 is crushed without deforming the dash lower panel 12 substantially, so a great amount of striking energy at the time of a collision can be absorbed.

Further, since the second dash lower panel 16 connects the bent portions 10a of the right and left front side members 10, even if an offset collision occurs, input from one front side member 10 is transmitted also to the other front side member 10 so as to be dispersed efficiently.

Moreover, since the closed cross section 22 which is extended in the vehicle-widthwise direction connects the right and left front side members 10, rigidity of the vehicle body can be further improved.

Furthermore, points at which the root portions R of the front side members 10 are jointed to the second dash lower panel 16 is in positions which are more forward than the conventional points at which the root portions are jointed to the dash lower panel, and thus the front side members are close to a strut tower 24, so the rigidity of the vehicle body against input from a suspension and engine can be improved also in a normal state.

Here, in the present embodiment, the second dash lower panel 16 connects the bent portions 10a of the right and left front side members 10, but instead of this construction, the second dash lower panel 16 can be provided separately to the root portions R of the front side members 10 according to assumed input in the forward-and-backward direction from the front side members 10, etc.

What is claimed is:

1. A construction in a vehicle body in which a front side member extends longitudinally in a substantially fore-and-aft direction of a vehicle body and is joined to a lower surface of an essentially horizontal floor panel which extends both laterally and longitudinally in the vehicle, the floor panel being joined to a first upwardly oriented dash panel which extends laterally across the vehicle body, the construction comprising:

a first bent portion which is formed in said front side member so that said front side member includes a slanted portion which is angled downwardly with respect to said vehicle body, said first bent portion being located forward of said first dash panel so that a gap is left between said first bent portion and said first dash panel, the slanted portion extending from said first bent portion to a second bent portion which is formed in said front side member and which causes said front side member to extend along below said floor panel; and a second dash panel which is joined to the first dash panel and which is arranged to extend forwardly from the first dash panel through the gap between said first bent portion and said first dash panel and to be connected to the front side member so that a force acting toward a rear of the vehicle body along said front side member, is transmitted from said front side member via said second dash panel to said first dash panel.

2. A construction in a vehicle body in which a front side member extends longitudinally in a substantially fore-and-aft direction of a vehicle body and is joined to a lower surface of an essentially horizontal floor panel which extends both laterally and longitudinally in the vehicle, the floor panel being joined to a first upwardly oriented dash panel which extends laterally across the vehicle body, the construction comprising:

a first bent portion which is formed in said front side member so that said front side member includes a slanted portion which is angled downwardly with respect to said vehicle body, said first bent portion being located forward of said first dash panel so that a gap is left between said first bent portion and said first dash panel, the slanted portion extending from said first bent portion to a second bent portion which is formed in said front side member and which causes said front side member to extend along below said floor panel; and a second dash panel which is joined to the first dash panel and which is arranged to extend forwardly from the first dash panel through the gap between said first bent portion and said first dash panel, said second dash panel being arranged so that a force acting toward a rear of the vehicle body along said front side member, is transmitted from said front side member via said second dash panel to said first dash panel;

wherein said second dash panel comprises:

an offset panel which extends from said first bent portion of said front side member to a lower portion of the first dash panel, and a coupling panel which extends directly from an upper end portion of said offset panel towards said first dash panel and is joined to said first dash panel.

3. A construction in a vehicle body in which a front side member extends longitudinally in a substantially fore-and-aft direction of a vehicle body and is joined to a lower surface of an essentially horizontal floor panel which extends both laterally and longitudinally in the vehicle, the floor panel being joined to a first upwardly oriented dash panel which extends laterally across the vehicle body, the construction comprising:

a first bent portion which is formed in said front side member so that said front side member includes a slanted portion which is angled downwardly with respect to said vehicle body, said first bent portion being located forward of said first dash panel so that a gap is left between said first bent portion and said first dash panel, the slanted portion extending from said first bent portion to a second bent portion which is formed in said front side member and which causes said front side member to extend along below said floor panel; and a second dash panel which is joined to the first dash panel and which is arranged to extend forwardly from the first dash panel through the gap between said first bent portion and said first dash panel, said second dash panel being arranged so that a force acting toward a rear of the vehicle body along said front side member, is transmitted from said front side member via said second dash panel to said first dash panel;

wherein said front side member is a right front side member provided on a right side of the vehicle body wherein a left front side member is provided on a left side of the vehicle body, and wherein said second dash panel is connected to both the right front side member on the right of the vehicle and the left front side member on the left of the vehicle.

4. A construction according to claim 3, wherein said second dash panel connects the right front side member and the left front side member between said first bent portion which is provided on the right front side member and the first bent portion which is provided on said left front side member.

5. A construction in a vehicle body in which a front side member extends longitudinally in a substantially fore-and-aft direction of a vehicle body and is joined to a lower surface of an essentially horizontal floor panel which extends both laterally and longitudinally in the vehicle, the floor panel being joined to a first upwardly oriented dash panel which extends laterally across the vehicle body, the construction comprising:

a first bent portion which is formed in said front side member so that said front side member includes a slanted portion which is angled downwardly with respect to said vehicle body, said first bent portion being located forward of said first dash panel so that a gap is left between said first bent portion and said first dash panel, the slanted portion extending from said first bent portion to a second bent portion which is formed in said front side member and which causes said front side member to extend alone below said floor panel; and a second dash panel which is joined to the first dash panel and which is arranged to extend forwardly from the first dash panel through the gap between said first bent portion and said first dash panel, said second dash panel being arranged so that a force acting toward a rear of the vehicle body along said front side member, is transmitted from said front side member via said second dash panel to said first dash panel;

wherein said second dash panel in cooperation with said first dash panel forms a closed cross section structure which tends to be crushed flat against the first dash panel in response to the application of the force acting toward a rear of the vehicle body along said front side member and in a manner which protects the first dash panel from deformation.

6. A construction according to claim 5, wherein said closed cross section extends laterally across the vehicle body.

7. A construction according to claim 5, wherein said front side member is a right front side member and is provided on a right side of said vehicle body, wherein a left front side member is provided on the left of the vehicle body, and wherein the closed cross section structure extends between said first bent portion which is provided to the right front side member and a corresponding first bent portion which is provided on the left front side member.

8. A construction in a vehicle body comprising:

a pair of front side members which extend in a fore-and-aft direction of the vehicle body;

a first bent portion and a second bent portion formed in each of the front side members;

a slanted portion which extends downwardly at an angle from the first bent portion to the second bent portion located proximate a floor panel; and a dash panel which is connected to said pair of front side members and to the floor panel, said dash panel comprising:

first and second dash panel portions, the first dash panel portion, which extends laterally across the vehicle, being connected to the floor panel and arranged to be oriented upwardly within the vehicle at a first angle with respect to the floor panel which is more than the angle at which the slanted portion extends downwardly with respect to the floor panel, the second dash panel portion being disposed between and connected to the first dash panel portion and each of the pair of front side members in a manner to define a space ahead of the first dash panel portion and into which the slanted portions of each of the pair of front side members can be forced to absorb energy caused by a frontal collision.

9. A construction according to claim 8, wherein said second dash panel portion has a front wall and an upper wall and is arranged with the first dash panel portion to form a closed cross section structure.

10. A construction according to claim 8, wherein said second dash panel portion extends laterally across the vehicle body so as to connect said pair of front side members to each other.

11. A construction in a vehicle body comprising:

a pair of front side members which extend in a fore-and-aft direction of the vehicle body;

a first bent portion and a second bent portion formed in each of the front side members;

a slanted portion which extends downwardly at an angle from the first bent portion to the second bent portion located Proximate a floor panel; and a dash panel which is connected to said pair of front side members and to the floor panel, said dash panel comprising:

first and second dash panel portions, the first dash panel portion, which extends laterally across the vehicle, being connected to the floor panel and arranged to be oriented upwardly within the vehicle at a first angle with respect to the floor panel which less than the angle at which the slanted portion extends downwardly with respect to the floor panel, the second dash panel portion being disposed between the first dash panel portion and each of the pair of front side members in a manner to define a space ahead of the first dash panel portion and into which the slanted portions of each of the pair of front side members can be forced to absorb energy caused by a frontal collision;

wherein said second dash panel has a coupling surface which extends in a fore-and-aft direction of the vehicle body and an offset surface which extends vertically within the vehicle body so as to form a rectangular closed cross section portion ahead of the first dash panel.

12. A construction according to claim 11, wherein the offset surface which extends vertically within the vehicle, is connected to the first bent portion of each of said pair of front side members.

13. A construction according to claim 11, wherein said rectangular closed cross section expands from the second bent portion of said pair of front side members toward said first bent portion of said pair of front side members.

14. A construction according to claim 13, wherein said rectangular closed cross section extends from said first bent portion toward said upward direction of said vehicle body.

* * * * *